Patented May 26, 1953

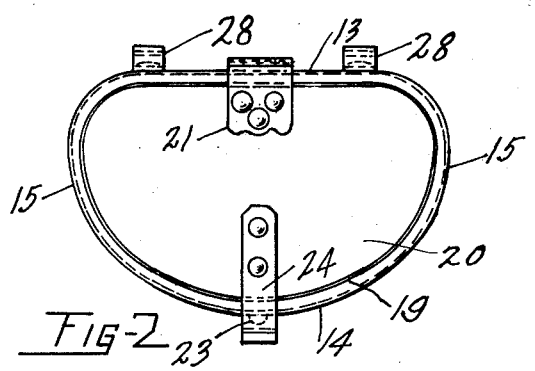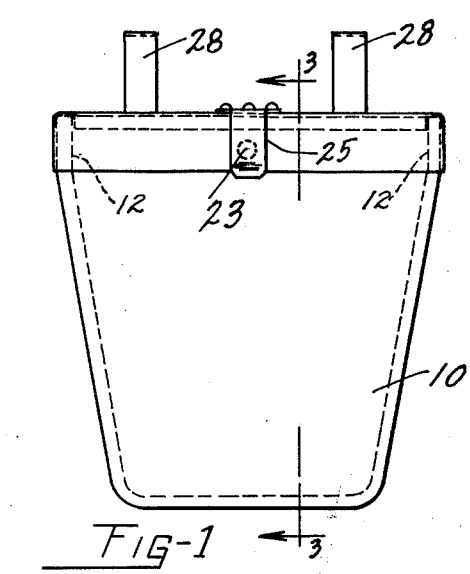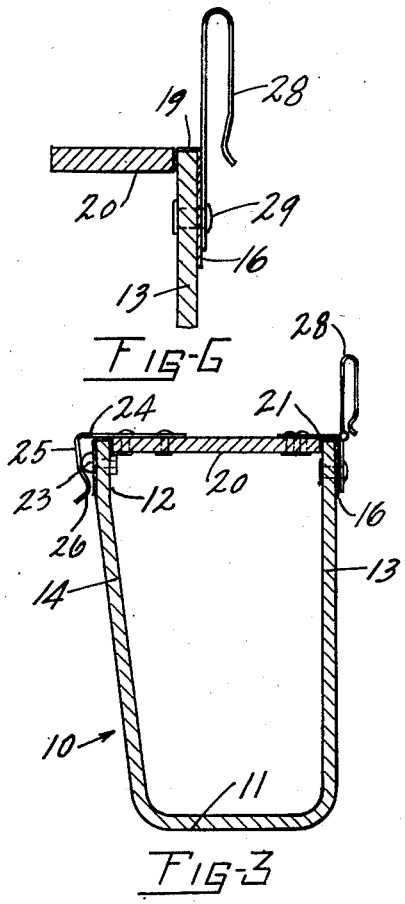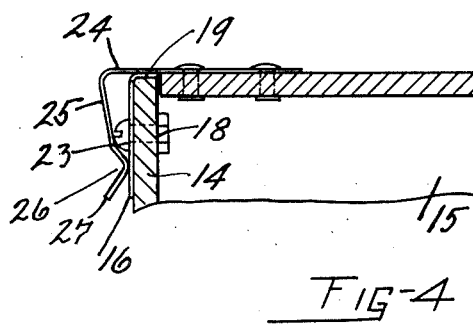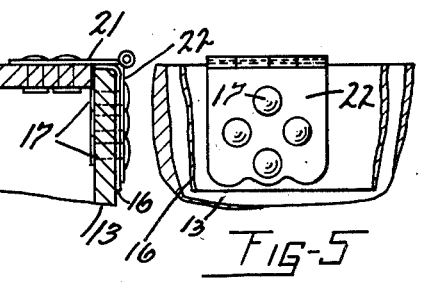

2,639,538

UNITED STATES PATENT OFFICE 2,639,538

BAIT BOX

George A. Gemmer, Richmond, Ind.

Application June 28, 1950, Serial No. 170,904

2 Claims. (Cl. 43—55)

This invention relates to a bait box for use by fishermen.

One object of the invention is to provide a simple efficient and readily accessible container for live bait which can be easily carried by the fisherman.

A further object of the invention is to provide such a container which is adapted to receive either minnows or crawling bait and maintain the same alive.

A further object of the invention is to provide such a container, the body of which is formed of substantially rigid material which will retain water therein for a long period of time, but is pervious to air and will "breathe" to keep the bait alive.

A further object of the invention is to provide such a container, the body of which can be formed by molding and is of such shape that it will fit snugly against the body of the fisherman and that a plurality of bodies may be packed in a relatively small space for shipping or storage.

A further object of the invention is to provide such a container, the body of which is reinforced to provide a strong support for the closure, hinges, the latch, and the container supporting means.

A further object of the invention is to provide such a container with a closure which can be opened and bait removed therefrom by the use of one hand only of the fisherman.

Other objects of the invention will appear as the device is described in detail.

In the accompanying drawings, Fig. 1 is a front elevation of a bait box embodying the invention; Fig. 2 is a top plan view of the same; Fig. 3 is a vertical section taken on the line 3—3 of Fig. 1; Fig. 4 is a sectional view taken through the closure and the upper portion of the body on the line 3—3 of Fig. 1, and showing the parts on an enlarged scale; Fig. 5 is a rear elevation of the hinge, showing the same attached to the body; and Fig. 6 is a sectional detail showing one of the spring belt clips extending above the body.

In these drawings I have illustrated a preferred embodiment of the invention and have shown the same as comprising a one-piece body 10 formed by molding a material which is substantially impervious to water, that is, will retain water therein for long periods of time, but which is pervious to air, such as a moldable pulp of suitable character such as disclosed in United States Letters Patent No. 1,843,563. The body of the box, or container, comprises a bottom wall 11 and upright walls which diverge upwardly from the bottom wall for the major portion of their lengths and are provided at their upper ends with relatively short vertical and parallel portions 12. The body may be of any suitable form and the form here shown is designed to facilitate the molding thereof and also to enable the bodies to be nested one in the other and thus packed in a relatively small space for shipping or storage. The body may be of any suitable cross sectional shape but it is preferably curved in cross section so as to impart thereto a shape which is compact and does not project unnecessarily beyond the body of the fisherman carrying the same. It is here shown as approximately semicircular in horizontal cross section and the upright walls include a flat back wall 13 and a front wall 14 spaced from the back wall and arcuate in cross section. The ends of the front wall are curved rearwardly to form side walls 15 of the body and merge into the back wall.

The upper edge of the body is reinforced by a band 16, preferably of metal, which extends about the upper vertical portions of the upright walls and is rigidly secured thereto, as by rivets, or bolts, 17 and 18. At its upper edge this band is provided with a flange 19 which extends inwardly across and in contact with the upper edge of the body. The band protects the upper portion of the body against distortion and provides a strong and rigid support for parts attached to the body.

The upper end of the body is closed by a closure, or lid, 20 which, when in its closed position, extends into the body. It is of a shape corresponding to the shape of the upper end of the body and, preferably, is pivotally mounted on the back wall 13, as by a hinge, one leaf 21 of which is rigidly secured to the closure and extends across the upper edge of the back wall and the other leaf 22 of which is rigidly secured to the back wall, preferably by the rivets 17, the axis of the hinge being in the present instance, in the rear of the back wall. The closure fits within the body with sufficient looseness to permit it to move freely into and out of its closed position and for most kinds of bait the closure need not be such as to permit the passage of air about the closure. When the bait box is to be used with bait requiring a larger amount of air the closure may be constructed to permit air to pass about or through the same. In either arrangement the closure prevents any material splashing of water from the body of the container.

Any suitable latch means may be provided for retaining the closure in its closed position within the upper end of the body. In the arrangement shown, a keeper 23 is rigidly secured to the band 16 and to the front wall of the body and may conveniently be the head of the bolt 18 which forms a part of the connection between the band 16 and the body. A latch member 24 is secured to the closure, extends across the front wall above the flange 19 of the band and has a part 25 extending downwardly therefrom and adapted to releasably engage the keeper, the latch member as a whole being preferably formed from a strip of resilient metal. The lower portion of the downwardly extending part of the latch member is bent inwardly to provide a projection 26 to engage beneath the keeper 23 and the lower part 27 of the inwardly bent portion serves first to guide the projection 26 across the keeper and then as a finger piece by which the part 25 may be disengaged from the keeper, thus enabling the closure to be released and moved to its open position, bait removed from the box and the closure again closed by the use of one hand of the fisherman while the other hand is otherwise engaged.

The box may be provided with any suitable means for supporting the same on the fisherman. In the present instance this means comprises a pair of spring clips 28 adapted to be slipped over the fisherman's belt and thus support the box. Preferably the clips are pivotally mounted on the rear portion of the band 16, as by rivets 29, so that they may be moved to operative positions in which they extend above the top of the box or to inoperative positions in which they are located below the top of the box and are out of the way when the box is to be packed for shipment or otherwise.

Thus it will be apparent that I have provided a bait box which may contain water in sufficient quantity to enable minnows to be kept alive therein, or may receive and keep alive crawling bait, such as crawfish. When used for crawling bait, moist absorbent material is preferably placed in the bottom of the box. In either instance, air enters the container through the walls thereof and permeates the contents of the box in sufficient quantities to keep the bait alive. The box can be easily opened and bait removed therefrom by the use of one hand of the fisherman while the box is attached to the belt of the fisherman. Further, the box, while of a size ample for different kinds of bait, is relatively small in size and of such a shape that it can be easily carried by the fisherman, either on his belt or otherwise, and is easily formed by molding. The reinforcing band provides means whereby the lid, or closure, supporting device may be supported thereon without danger of damaging or distorting the box.

While I have shown and described one embodiment of my invention, I wish it to be understood that I do not care to be limited to the details thereof, as many modifications may occur to a person skilled in the art.

Having now fully shown and described my invention, what I claim as new and desire to secure by Letters Patent, is:

1. A bait box comprising a one-piece hollow body of air permeable material, said body having upright walls and a bottom wall of substantial thickness, the body material being substantially impervious to water and pervious to air, a relatively narrow metallic band extending about the upper portions of said upright walls and constituting the sole support for said body, a closure for the upper end of said body, a hinge having a part secured to said closure and a part on the outer side of said band on one side of said body, an attaching device extending through said body, said band and the last mentioned part of said hinge and rigidly connecting the same one with the other, a second attaching device extending through said body and said band at the other side of said body to rigidly connect the same one with the other and having a part projecting outwardly beyond said band and forming a latch member, a second latch member secured to said closure and extending downwardly therefrom to operatively engage the first mentioned latch member, and a carrying device connected with said band.

2. A bait box having a one-piece body of moldable material which is substantially impervious to water and pervious to air, said body including a bottom wall and upright walls diverging upwardly from said bottom wall and having substantially vertical upper portions, said bait box being characterized by a metallic band extending about and rigidly secured to said vertical portions of said upright walls and having a flange extending inwardly across the upper edges of said upright walls, said band constituting the sole support for said body, a closure for said body, a hinge having pivotally connected parts secured respectively to said closure and to said band at one side of said body, a latch member secured to said band at the other side of said body, a second latch member secured to said closure and having a part to engage the first mentioned latch member, and carrying means secured to said band.

GEORGE A. GEMMER.

References Cited in the file of this patent

UNITED STATES PATENTS

| Number | Name | Date |
|---|---|---|
| 28,085 | Hughes | May 1, 1860 |
| 319,169 | Baker | June 2, 1885 |
| 366,650 | Danheiser | July 19, 1887 |
| 886,337 | Balken | May 5, 1908 |
| 1,059,221 | Saylor | Apr. 15, 1913 |
| 1,300,712 | Ferdon | Apr. 15, 1919 |
| 1,476,230 | Thompson | Dec. 4, 1923 |
| 1,713,349 | Owen | May 14, 1929 |
| 1,797,098 | Minehart | Mar. 17, 1931 |
| 1,843,563 | Knoernschild | Feb. 2, 1932 |
| 1,930,673 | Consolazio | Oct. 17, 1933 |
| 2,328,993 | Norling | Sept. 7, 1943 |